United States Patent
Swamylingappa et al.

(10) Patent No.: US 6,589,574 B2
(45) Date of Patent: Jul. 8, 2003

(54) PROCESS FOR PREPARATION OF PROTEIN-HYDROLYSATE FROM MILK PROTEIN

(75) Inventors: Bhagya Swamylingappa, Mysore (IN); Johny Joseph, Mysore (IN); Kowsalya Shankara Murthy, Mysore (IN); Vishweshwariah Prakash, Mysore (IN); Mysore Cheluvaraya Shamanthaka Sastry, Mysore (IN); Tirumakudalu Chikkaraja Sindhu Kanya, Mysore (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 09/811,767

(22) Filed: Mar. 19, 2001

(65) Prior Publication Data

US 2002/0132288 A1 Sep. 19, 2002

(51) Int. Cl.$^7$ .......................... A23C 9/12; A23C 17/00; A23B 4/12; A23L 1/13; C12P 21/06

(52) U.S. Cl. .............................. 426/34; 426/37; 426/42; 426/55; 426/56; 435/68.1

(58) Field of Search .............................. 426/34, 42, 44, 426/52, 56, 37, 55; 435/68.1

(56) References Cited

U.S. PATENT DOCUMENTS 4,107,334 A * 8/1978 Jolley et al.
4,293,571 A * 10/1981 Olofsson et al.
5,547,687 A * 8/1996 Outinen et al.

\* cited by examiner

*Primary Examiner*—Mark Navarro

(57) ABSTRACT

The present invention provides a process for the preparation of protein hydrolysate from milk protein by treating milk protein with fungal protease at a pH of 7.5–8.5, a temperature of 40±5° C. for a time period of 30 min to 2 hours, followed by heating at 65–70° C. for at least 3 min, separating the clarified supernatant by a known manner and drying the clarified liquor thus obtained to get the protein hydrolysate.

17 Claims, No Drawings

PROCESS FOR PREPARATION OF PROTEIN-HYDROLYSATE FROM MILK PROTEIN

FIELD OF THE INVENTION

The present invention relates to a process for the preparation of protein hydrolysate from milk protein using fungal protease. Particularly, the present invention provides a process for the preparation of protein hydrolysate from casein using fungal protease obtained from Aspergillus sp.

BACKGROUND OF THE INVENTION

Casein is a good protein with well-balanced amino acid make-up. Casein as such has limited functional properties. Casein constitutes about 80% of the milk proteins. It is a phospho protein where phosphorus is covalently bound to polypeptide chain by serine ester linkages/the casein consists of heterogeneous $\alpha$, $\beta$-casein, $\kappa$-casein and few other minor proteins. Casein is used in the food industry in the preparation of simulated meat, wine and beer clarifier and protein enriched dairy products (Evans, E. W. Uses of milk proteins in formulated foods in Developments in Food Proteins—1 Ed. B. J. F. Hudson, Applied Science Publishers, London, pp. 131–169). They are also used in crackers, snack foods and other food formulations to improve functional and nutritional characteristics. Casein hydrolysates find their application in food products.

The reduction in the molecular size of the protein can be accomplished by breaking peptide bonds using acid or alkali or enzymatic methods. Acid and alkali hydrolysis of protein leads to decreased nutritive value because of recemisation and destruction of essential amino acids, production of toxic constituents like lysino-alanine.

Enzymatic methods accomplish protein hydrolysis selectively without causing structural changes in the amino acids that make up the proteins. The peptide profile generated by enzymatic methods are well defined. The protein retains its nutritive value in enzymatic hydrolysis better than any traditional acid/alkali hydrolysis. The strong tendency of casein and whey protein to form bitter tasting hydrolysates is well known; and nearly all the development work, in particular on casein hydrolysis processes has centered around the bitterness problem. The recovery and modification of proteins by enzymatic hydrolysis is a versatile tool. The hydrolysis is precise and unique for a given proteinase-protein system. The degree of hydrolysis determines the properties such as solubility, functionality and taste of hydrolysed protein. Protein hydrolysates can be good additives to improve the functional characteristics and nutritional value of the end products. Most of the protein hydrolysates commercially available in India are acid protein hydrolysates. The humin formation, high temperature involvement, brown colour formation, high salt content, destruction of some of the essential amino acids and low yield are some of the drawbacks in the acid hydrolysis. Chlorohydrines are produced during acid hydrolysis of vegetable protein. Chlorohydrines are eliminated from liquid hydrolysates by subjecting them to steam distillation at reduced pressure.

The substrate casein is widely used protein for the preparation of hydrolysate owing to its superior nutritional quality. Traditionally casein hydrolysates are used for dietetic feeding. Casein hydrolysate is used in infant and specialized nutritional formulae.

Reference may be made to a published paper entitled Enhancing the Functionality of Food Proteins by Enzymatic Modification, by Panyan, D. and Kilara, A., Trends in Food Sci. Tech., 7(4), 120–125, wherein the enzyme hydrolysis influence emulsifying capacity, hydrophobicity of proteins. The drawback of the method is the degree of hydrolysis is not defined.

Reference may be made to a published paper entitled dietary enzymic hydrolysates of protein with reduced bitterness Clegg, K. M. and McMillan, A. D. (1974) J. Food Tech. 9(1), 21–29, wherein, egg white and casein have been investigated as protein substrates and treated with papain, optionally with chloroform followed by endopeptidases and pig's kidney tissue as a source of exopeptidases. Hydrolysates are relatively free of bitterness and continuing small peptides and over 50% free amino acids have been obtained. The draw back of the method is that the yields are low (60.6–85.5%). Further the process involves multiple steps, double enzyme system and the protease used is obtained from animal sources.

Reference may be made to a published paper entitled debittering and nutritional upgrading of enzymic casein hydrolysates Cogan, V., Moshe, M., Mokady, S. (1981) J. Sci. Food. Agric. 32(5), 459–466, wherein, casein hydrolysates obtained by digestion using papain and pepsin was performed essentially according to the procedure of Clegg and McMillan (1974). A casein solution (pH 7.2) was first treated with papain at 40° C. The enzyme concentration was 4.0%, and 0.2% toluene was added to prevent microbial growth. At the end of an 18 h incubation the pH was adjusted to 3.0 using hydrochloric acid and the treatment continued for an additional 22 h with 0.5% with 0.5% pepsin at 37° C.

The treatment with Rhozyme enzymes was performed with specified enzyme concentrations under the following conditions of pH (adjusted using 1M NaOH) and temperature: Rhozyme P-11 and Rhozyme-41 concentrate at pH 8.5, 50° C.; Rhozyme P-53 concentrate at pH 7.5, 60° C.; Rhozyme-62 concentrate at pH 8.3, 60° C.

The extent of proteolytic digestion was examined as described previously except that the digested samples were diluted 21 fold with a 10% trichloracetic acid solution. Exhaustive enzymic digestion was achieved by incubating (at 37° C.) a 100 ml solution containing 298 mg casein and 6 mg protinase, for 15 h. At the end of the incubation period the solution was clear and its absorbance estimated at 280 nm using appropriate protein and enzyme blanks.

The bitter taste could be further reduced by treatment with 0.5 g of activated carbon/g hydrolysate. The drawback of the method is that the process involves a number of steps, a number of enzymes in sequence and as well as continuously and solvents are used to get the hydrolysate resulting in a cost ineffective process. Additional use of activated carbon is also involved for the production of casein hydrolysates to reduce bitterness.

Reference may be made to a published paper entitled Casein Hydrolysate Produced Using a Formed-in-Place Membrane Reactor, by Chland, W. D., Cordle, C. T., Thomas, R. L. J. Food. Sci. 60, 1349–1352, 1995. The degree of hydrolysis is reported as being between 4 to 51%. The time of hydrolysis varies from 18–66 h. The draw back of the method is that it involves the long duration of the hydrolysis.

Reference may be made to a published paper entitled production of an enzymic hydrolysate of casein on a kilogram scale, Clegg, K. M., Smith, G. and Walker, A. L., 1974 J. Food Tech., 9(4), 425–431, 1974, wherein, the laboratory method for the hydrolysis of casein has been described. 12 kg of commercial casein was suspended in 220 l water at pH 6.2 and digested with papain at 40° C. for 8 h. and then with a pig kidney homogenate at pH 7.8–8.0 for 24 h. Chloroform was used as a preservative instead of toluene. The hydrolysate was passed through a Russell separator to remove insoluble material and then pasteurized at 83–88° C. for 3–5 min. The product was spray dried. The process was completed in 60 h. The bacterial counts were satisfactory. The draw back of the method is that the duration of the hydrolysis is too long. Further, the enzymes used are different. Hydrolysis is multi-step hence it is cost ineffective and time consuming.

Reference may be made to British Patent No. 1595499, (patent authority VEB Berlin—Chemie, 1981), wherein, casein is hydrolysed by boiling with dilute sulphuric acid and spray dried. The powder (100 g) is heated under reflux for 10 min with 200 ml. Methanol and the undissolved material is filtered off, washed twice with 50 ml methanol and dried resulting in 80 g hydrolysate having all amino acids as a colorless, odorless and tasteless powder. The draw back of the method is it involves the usage of mineral acid likely to lead to racemisation of the amino acids and generation of toxic principles.

Reference may be made to Japanese Patent No. 5134465, to Morinaga Milk Industry Co., Ltd., (1976), wherein a process for producing a concentrated liquid containing an enzymatically decomposed component of casein protein is described. The drawback of the method is that the end product is in liquid form, which is difficult to handle.

Reference may be made to U.S. Pat. No. 5,405,637 to Martinez, S. B., Leary, H. L. J., Nichols, D. J. (1995), wherein a milk protein hydrolysate prepared by enzymic hydrolysis and an infant formula prepared from the hydrolysate are described. The hydrolysate has a reduced antigenicity and is prepared form a mixture of whey protein and casein, the degree of hydrolysis is between 4 and 10%. The drawback of the process is the low degree of hydrolysis.

Reference may be made to European Patent No. 0321603A1 to Jost, R., Meister, N. and Monti, J. C. (1989), wherein hypoallergenic whey protein hydrolysates are prepared by a process in which the initial proteolysate is heat treated at 80–100° C. for 3–10 min at pH 6–8, cooled to 40–60° C., and is subjected to a second enzymic hydrolysis (with trypsin, chymotrypsin, or a trypsin/chymotrypsin/pancreatin mixture). The proteolytic enzyme is then inactivated by heating to 75–85° C. The hypoallergenic proteolysate may be incorporated in dietetic preparations, foods for infants, etc. The drawback of the method is use of very high temperature and proteolytic enzymes of animal origin.

Reference may be made to U.S. Pat. No. 4,293,571 to Olofsson, M., Buhler, M., Wood, R. (1981), wherein a process for the preparation of a purified protein hydrolysate in which a typical example, an aqueous solution of dried whey is sterilized by steam injection at 115° C. for 10–30 sec. After cooling to 55° C., the pH is adjusted to 7.2 with calcium hydroxide $(Ca(OH)_2)$ and 8% of pancreatin is added, hydrolysis being allowed to proceed for 5 h at 50–55° C. The pH is then readjusted to 6.7 with phosphoric acid $(H_3PO_4)$ followed by heat treatment, e.g., 98° C. for 30 min to denature the proteins which are then eliminated from the heat-treated hydrolysate by ultrafiltration, leaving a permeate constituting the purified protein hydrolysate. The hydrolysate is suitable for use in infant, dietetic and convalescent foods. The drawback of the method is use of a very high temperature and proteolytic enzymes of animal origin.

Reference may be made to Swiss Patent No. 570121 to Mueller, H. (1975), wherein a method for producing a light colored high glutamate seasoning hydrolysate from milk protein. For the process whey having an average lactose content of approximately 4.5% is aerobically fermented with yeast strains having a high glutamic acid content. The fermentation product is hydrolysed with hydrochloric acid (HCl) after concentrating which may be followed by drying, the hydrolysate being neutralized, filtered and optionally concentrated in the usual manner. Concentrating of the fermentation broth by ultrafiltration permits the lactoglobulins and lactalbumins to be retained in the concentrate, which increases the yield after hydrolysis by 15–25%. If ultrafiltration is carried out before fermentation, the retained whey proteins are added to the pre-concentrated yeast before hydrolysis. The light colored hydrolysate product has no yeasty taste. The draw back of the process is the organism and type of enzyme. Fermentation is different.

Reference may be made to U.S. Pat. No. 3,778,514, Olson, F. C. (1973), wherein a nutritional product of whey protein and collagen hydrolysate. This process specification covers various mixtures of whey concentrate and collagen hydrolysate (obtained as a waste product from the tank water following the steam rendering of fat). In one example, an imitation milk product is obtained by mixing 9 parts of lactose—reduced whey concentrate (40% solids) with 1 part of collagen hydrolysate (40% solids). The product contains 33.6% protein, 42.0% lactose, 19.1% minerals and 4.2% moisture and has an amino acid profile between that of soy bean meal and casein.

OBJECTS OF THE INVENTION

The main object of the present invention is to provide a process for the preparation of protein hydrolysate from milk protein using fungal protease.

Another object of the present invention is to provide a process for the preparation of protein hydrolysate from whey/casein using fungal protease obtained from Aspergillus sp.

Still another object of the present invention is to provide a protein hydrolysate with a high degree of hydrolysis at a temperature of 40±5° C.

Yet another object of the present invention is to provide a process for preparing protein hydrolysate soluble over a wide range of pH, i.e., 2 to 11.

SUMMARY OF THE PRESENT INVENTION

Accordingly, the present invention provides a process for the preparation of protein hydrolysate from milk, which comprises treating milk protein with fungal protease at a pH of 7.5–8.5 at a temperature of 40±5° C. for a time period of 30 min to 2 hours, then heating at 65–70° C. for at least 3 min, separating the clarified supernatant by a known manner and drying the clarified liquor thus obtained to get the protein hydrolysate.

DESCRIPTION OF THE INVENTION

Accordingly, the present invention provides a process for the preparation of protein hydrolysate from milk protein, the process comprising: treating milk protein with fungal protease at a pH of 7.5–8.5 at a temperature of 40±5° C. for a time period of 30 minutes to 2 hours, then heating at 65–70° C. for at least 3 minutes, separating the clarified supernatant by a known manner and drying the clarified liquor thus obtained to get the protein hydrolysate.

In an embodiment of the present invention, the fungal protease obtained is from Aspergillus sp.

In another embodiment of the present invention, the Aspergillus fungus is selected from the group comprising *A. flavus, A. japonicus, A. niger* and *A. awamori*

In still another embodiment of the present invention, the milk protein is selected from the group comprising whey and casein.

In yet another embodiment of the present invention, the pH value is maintained between 7.6 to 8.0 for maximum fungal protease activity.

In one more embodiment of the present invention, the working temperature range during hydrolyzation of proteins is 40–45° C.

In another embodiment of the present invention, the hydrolysis is effected for 1.5 to 2 hours.

In an embodiment of the present invention, the drying is effected by freeze drying, spray drying and drum drying.

In another embodiment of the present invention, the protein hydrolysate has 0.4 to 0.5% perceptible threshold bitterness.

In still another embodiment of the present invention, high yield of protein hydrolysate with 50% degree of hydrolysis is obtained from the raw material taken.

In yet another embodiment of the present invention, the protein hydrolysate obtained is creamish white in color.

In one more embodiment of the present invention, 95% of protein hydrolysate is obtained.

In another embodiment of the present invention, the protein hydrolysate has 11.5 to 12.5% nitrogen and 4.5 to 5% ash.

In an embodiment of the present invention, the protein hydrolysate is soluble in water in all pH ranges.

In another embodiment of the present invention, the amino acid composition of the protein hydrolysate was similar to the amino acid makeup of the starting material.

In still another embodiment of the present invention, the protein hydrolysate retained all the nutritive values of the starting material.

In yet another embodiment of the present invention, the hydrolysis process is terminated by adjusting the pH and the temperature simultaneously to a point at which the protease enzyme system is most sensitive to heat damage and then to bring the slurry to elevated temperatures of 65–70° C. for 3–5 minutes thereby destroying enzyme activity and terminating hydrolysis.

The present invention also provides a protein hydrolysate cremish white in color.

In an embodiment of the present invention, 95% protein hydrolysate is obtained.

In another embodiment of the present invention, the protein hydrolysate comprises 11.5 to 12.5 % nitrogen and 4.5 to 5% ash.

In still another embodiment of the present invention, the protein hydrolysate has 0.4 to 0.5% perceptible threshold bitterness.

In yet another embodiment of the present invention, the protein hydrolysate is soluble in water in all pH ranges.

In one more embodiment of the present invention, the amino acid composition of the protein hydrolysate is similar to the amino acid makeup of the starting material.

In an embodiment of the present invention, the protein hydrolysate having 50% degree of hydrolysis is obtained.

The Invention Involves the Following Process Steps—Casein

Casein is a phosphoprotein that contains 0.7 to 0.9% of phosphorus covalently bound to the polyphenols chain by serine ester linkages. Calcium and citrate are also included in this structure. Acid casein is obtained by precipitating milk with an acid such as HCl, sulphuric acid or lactic acid. Sweet casein results from the action of chymosin. Low viscosity casein is produced by treating milk with proteolytic enzymes/and an acid. The basic operations in the production of casein are the same irrespective of the type of casein produced. Such operations consist of the precipitation of the curd and its washing, pressing and drying. In most countries the largest amount of casein is produced by the acid process. The casein to be used for protein hydrolysate must be of edible quality and bacteriologically pure.

Enzyme

The enzyme used is fungal protease, the activity being 30,000 units/g.

Measurement of Degree of Hydrolysis

Tri-nitrobenzenesulphonic acid (TNBS) procedure, is an accurate, reproducible and generally applicable procedure for determining the degree of hydrolysis of food protein hydrolysates. The protein hydrolysate is dissolved/dispersed in hot 1% sodium dodecyl sulphate to a concentration of $0.25-2.5 \times 10^{-3}$ amino equivalents/L. A sample solution (0.25 ml) is mixed with 2 ml of 0.2125 M sodium phosphate buffer (pH 8.2) and 2 ml of 0.1% trinitrobenzenesulphonic acid, followed by incubation in the dark for 60 min at 50 C. The reaction is quenched by adding 4 ml of 0.100 N HCl, and the absorbance is read at 340 nm. A 1.5 mM L-leucine solution is used as the standard. Transformation of the measured leucine amino equivalents to a degree of hydrolysis is carried out by means of a standard curve for each particular protein substrate. (Reference: Jens Adler—Nissen, J. Agr. Food Chem. Vol. 27, No. 6, 1979.)

Casein was dispersed in water with a suitable solvent to solute ratio and the pH of the dispersion was adjusted to 7.6–8.0 using 15N sodium hydroxide. This was kept stirring for a few minutes with mechanical stirrer and then temperature raised to 40–45° C. At this stage 1% of fungal protease on the basis of protein content of the raw material was added and stirring continued for 1½,–2 h. At the end of the above time interval the temperature of the slurry was raised to 65–70° C. for 3–5 min. The slurry was cooled to room temperature and the insoluble material in the dispersion was removed by centrifugation. The clarified protein hydrolysate was spray dried to obtain protein hydrolysate.

The following examples are given by way of illustration of the present invention and therefore should not be constructed to limit the scope of the present invention.

EXAMPLE 1

200 g of casein was dispersed in 2 L of water and the pH of the dispersion was adjusted to 7.8 using 15% sodium hydroxide (NaOH). The slurry was maintained at 40° C. Fungal protease dissolved in water was added to the slurry. After 1½ h. the temperature of the slurry was raised to 65° C. for 3 min was cooled and centrifuged. The clear supernatant was spray dried. The product had a degree of hydrolysis of 45% with a yield of 90%.

EXAMPLE 2

1 kg of casein was dispersed in 10 L of water and the pH was adjusted to 7.8 using 15% NaOH. The slurry was maintained at 40° C. Fungal protease dissolved in water was added to the slurry. After 2 h. the temperature of the slurry was raised to 65° C. for 3 min cooled and centrifuged. The clear supernatant was spray dried. The product had a degree of hydrolysis of 45% with a yield of 95%.

EXAMPLE 3

5 kg of casein was dispersed in 50 L of water and the pH was adjusted to 7.8–8.0 using 15% NaOH. The slurry was maintained at 45° C. Fungal protease dissolved in water was added to the slurry. After 2 h. the temperature of the slurry was raised to 70° C. for 5 min cooled and centrifuged. The clear supernatant was spray dried. The product had a degree of hydrolysis of 50% with a yield of 93%.

EXAMPLE 4

5 kg of casein was dispersed in 50 L of water and the pH of the dispersion was adjusted to 8.0 using 15% NaOH. The slurry was maintained at 45° C. Fungal protease dissolved in water was added to the slurry. After 2 h., the temperature of the slurry was raised to 70° C. for 5 min., cooled and centrifuged. The clear supernatant was spray dried.

The product had a degree of hydrolysis of 50% with an yield of 95% casein protein hydrolysate obtained has creamish white colour with the milky flavour with an yield of 90% (on protein basis). The product has 11.5–12.5% nitrogen, 4.5–5% ash content with degree of hydrolysis of 45–50%. The product is highly soluble in water in all the pHs range. The protein hydrolysate had a perceptible threshold bitterness at 0.4 to 0.5%. It retained all the nutritive value of the starting material.

The main advantages of this invention are:
1. The ratio of water to protein is comparably less and one step pH adjustment, the salt content is minimal.
2. The fungal protease enzyme from fungal origin used is commercially available and has a very short duration of proteolysis.
3. The high degree of hydrolysis (45–50%) is achieved with a single enzyme and in a short time.
4. The yield is very high, being 90–95%, with a higher nitrogen content of 11.5–12.5%.
5. There if no need to add antibacterial agent to prevent microbial growth because the process is completed within 1½–2 h.
6. Starting material is preserved with minimum loss of essential amino acids.

What is claimed is:
1. A process for the preparation of protein hydrolysate from a milk protein, said process comprising:
   hydrolyzing an aqueous milk protein with a fungal protease obtained from Aspergillus sp. at a pH of 7.5 to 8.5, a temperature of 40±5° C. for a time period of 30 mm to 2 hours;
   heating the resulting reaction mixture at 65 to 70° C. for at least 3 min; and
   separating a clarified supernatant and drying the clarified liquor thus obtained to get protein hydrolysate.
2. A process as claimed in claim 1, wherein the Aspergillus fungus is selected form the group comprising *A. flavus, A. japonicus, A. Niger* and *A. awamori*.
3. A process as claimed in claim 1, wherein the milk protein is selected from the group comprising of whey and casein.
4. A process as claimed in claim 1, wherein the pH value is maintained between 7.6 to 8.0 for maximum fungal protease activity.
5. A process as claimed in claim 1, wherein the working temperature range during hydrolyzation of proteins is 40–45° C.
6. A process as claimed in claim 1, wherein the hydrolysis is effected for 1.5 to 2 hours.
7. A process as claimed in claim 1, wherein the drying is effected by freeze drying, spray drying and drum drying.
8. A process as claimed in claim 1, wherein the protein hydrolysate has 0.4 to 0.5% perceptible threshold bitterness.
9. A process as claimed in claim 1, wherein the protein hydrolysate has a 45 to 50% degree of hydrolysis.
10. A process as claimed in claim 1, wherein the protein hydrolysate obtained is creamish white in color.
11. A process as claimed in claim 1, wherein 95% protein hydrolysate is obtained.
12. A process as claimed in claim 1, wherein the protein hydrolysate has 11.5 to 12.5% nitrogen, 4.5 to 5% ash.
13. A process as claimed in claim 1, wherein the protein hydrolysate is soluble in water in all pH ranges.
14. A process as claimed in claim 1, wherein amino acids present in the milk protein are retained in the protein hydrolysate.
15. A process as claimed in claim 1, wherein the protein hydrolysate retained all the nutritive values of the starting material.
16. A process as claimed in claimed 1, wherein the hydrolysis is terminated bringing the slurry to 65–70° C. for 3–5 minutes thereby destroying the enzyme activity and terminating hydrolysis.
17. A process for preparation of protein hydrolysate from a milk protein selected from the group consisting of whey and casein, said process comprising:
    treating said milk protein with a fungal protease at a pH of 7.5 to 8.5, a temperature of 40±50° C. for a time period of 30 min to 2 hours;
    heating the resulting reaction mixture at 65 to 70° C. for at least 3 mm; and
    separating a clarified supernatant and drying the clarified liquor thus obtained to get hydrolysate.

* * * * *